United States Patent [19]
West

[11] Patent Number: 6,094,772
[45] Date of Patent: *Aug. 1, 2000

[54] WINDSHIELD WIPER ARM RETAINER WITH INTEGRAL NOZZLE BRACKET

[75] Inventor: Wilbert W. West, Troy, Ohio

[73] Assignee: ITT Manufacturing Enterprises, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,821

[22] Filed: Jan. 30, 1998

[51] Int. Cl.[7] .................................. B60S 1/32; B60S 1/52
[52] U.S. Cl. .................................. 15/250.04; 15/250.351; 239/284.1
[58] Field of Search ................. 15/250.04, 250.351, 15/250.352, 250.34, 250.31; 239/284.1, 284.2, 283, 282

[56] References Cited

U.S. PATENT DOCUMENTS

| | | | |
|---|---|---|---|
| 2,549,027 | 4/1951 | Smulski | 15/250.04 |
| 3,008,170 | 11/1961 | Marks | 15/250.04 |
| 3,427,675 | 2/1969 | Tibbet | 15/250.351 |
| 3,670,354 | 6/1972 | Weber | 15/250.351 |
| 3,827,101 | 8/1974 | Wubbe | 15/250.04 |
| 3,916,473 | 11/1975 | Williams | 15/250.351 |
| 5,046,215 | 9/1991 | Kobayashi | 15/250.351 |
| 5,239,726 | 8/1993 | Bianco | 15/250.351 |
| 5,327,614 | 7/1994 | Egner-Walter et al. | 15/250.04 |
| 5,349,717 | 9/1994 | Patterson et al. | 15/250.04 |
| 5,383,602 | 1/1995 | Edele et al. | 15/250.04 |
| 5,398,370 | 3/1995 | Gorner et al. | 15/250.04 |
| 5,430,909 | 7/1995 | Edele et al. | 15/250.04 |
| 5,433,382 | 7/1995 | Baumgarten et al. | 239/284.1 |
| 5,454,134 | 10/1995 | Edele et al. | 15/250.04 |
| 5,564,158 | 10/1996 | Bauer et al. | 15/250.351 |
| 5,652,994 | 8/1997 | Egner-Walter et al. | 15/250.351 |
| 5,903,953 | 5/1999 | Dimur et al. | 15/250.04 |

FOREIGN PATENT DOCUMENTS

| | | | |
|---|---|---|---|
| 2547548 | 12/1984 | France | 15/250.04 |
| 4130023 | 3/1993 | Germany | 15/250.351 |

*Primary Examiner*—Gary K. Graham
*Attorney, Agent, or Firm*—J. Gordon Lewis

[57] ABSTRACT

A windshield wiper system for cleaning windshields and back lights of motor vehicles includes a windshield wiper arm assembly that can be attached to an oscillatory derivable wiper shaft by way of a mounting head. The wiper arm has a retainer which is essentially U-shaped in cross-section engaging an arm rod with its planar walls. Furthermore, the wiping system is provided with a fluid line, which is guided along the wiper arm in order to supply a washing nozzle with washing fluid. The washing nozzle is mounted upon a bracket which is integrally formed from one of the walls of the wiper arm retainer.

19 Claims, 3 Drawing Sheets

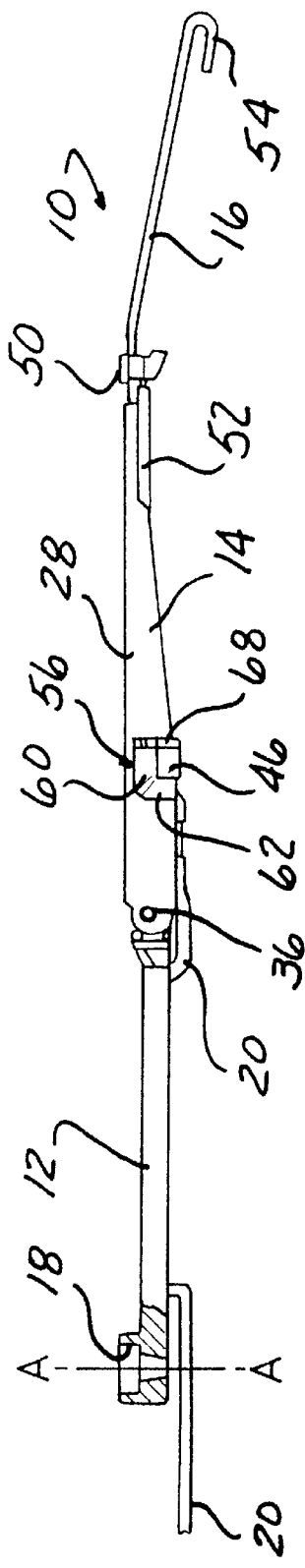
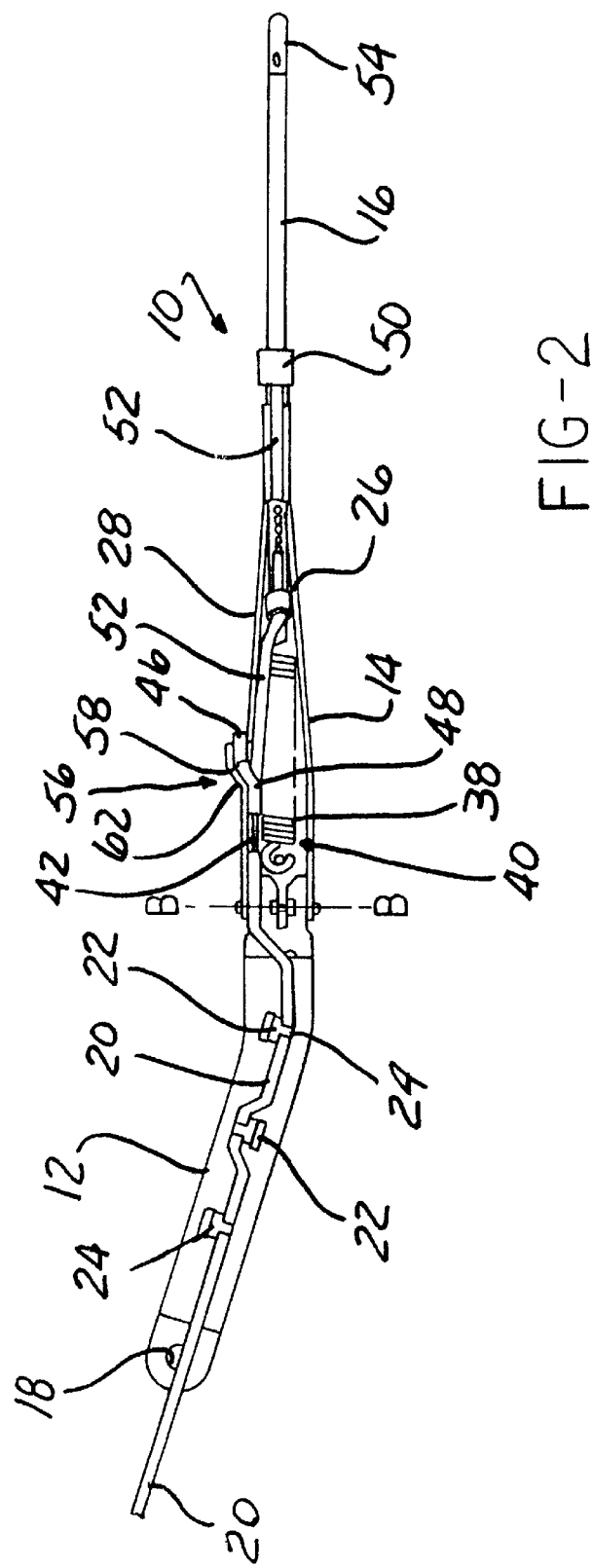
FIG-1
FIG-2

WINDSHIELD WIPER ARM RETAINER WITH INTEGRAL NOZZLE BRACKET

The present invention relates to windshield wiper arm assemblies, particularly those suited for automotive windshield wiping applications and, more particularly, to so called "wet arm" windshield wiper arm assemblies including systems for distribution and dispersion of windshield washer cleaning fluid.

BACKGROUND OF THE INVENTION

Windshield wiper arms used on motor vehicles usually comprise a fixing part or mounting head, a joining piece or retainer, an arm rod and a pressure spring. The mounting head is typically manufactured from die cast zinc or aluminum. The retainer is typically formed out of sheet metal in a generally U-shaped configuration. The arm rod is rigidly carried with the retainer and is pivotally attached to a wiper blade assembly. The mounting head is unrotatably coupled to the drive shaft of the host wiper drive which is arranged below the windshield of the automotive vehicle and is isolated by means of a known mechanism. To enable lifting of the wiper from the windshield, the retainer is pivoted to the mounting head about a mounting axis, which extends roughly perpendicular to the wiper drive shaft. A tension spring is typically employed for urging the wiper blade firmly against the windshield.

In order to ensure the proper contact pressure of the wiper at the windshield and its correct alignment in relation to the windshield surface, the wiper holder must be aligned in relation to the windshield surface, which may be different in various vehicle designs. Ideally, the wiper blade should be maintained perpendicular to the windshield surface.

Normally, windshield cleaning systems of modern motor vehicles comprise a wiper system as well as a windshield washing system including a washing liquid reservoir and a pump by which washing fluid is sprayed onto the windshield to be cleaned via a spraying device. There are motor vehicles in which this spraying device is stationarily arranged on the engine compartment hood. In other windshield cleaning systems the spraying device is fixed on the wiper arm. The advantage of this latter system is that the washing liquid is sprayed immediately in front of the wiper blade.

Mounting of wiper fluid spray nozzles on the wiper arm assembly has proven to be problematic inasmuch as modern vehicle windshields tend to be increasingly non-planar, requiring the wiper arm and blade assembly to flex to effectively apply constant wiping pressure over the entire swept surface.

A problem often encountered with hood mounted washer jets is that the cleaning fluid will be delivered to the windshield at a location above the wiper blade which is already partly through its upward cycle or at a point below the wiper blade when it is partly through its downward path, such that the cleaning fluid is spread by the wiper blade over only a portion of the windshield, thus resulting in only partial cleaning thereof. This problem generally requires the operator to repetitively supply fluid in order to clean the entire windshield, which wastefully depletes the fluid in the reservoir.

A similar problem encountered with hood-mounted washer jets is that delivery of the fluid onto the windshield may be to an area behind the path of the windshield wiper travel which may obstruct clear vision through the windshield until another half-cycle of the wiper action is completed, and then only a portion of the windshield may be cleaned. A further disadvantage of windshield washer jets of the hood-mounted type is that because the jet outlets are located relatively far from the windshield, if they are not aimed properly or later become misaligned, do to damage to the hood, for instance, the stream of fluid may strike the windshield in an ineffective location or miss the windshield entirely if, in addition, a too strong or to weak pumping action is used. Further, because the washer jets are spaced a relatively long distance from the windshield, a strong pumping force or small washer jet outlet, which may easily become clogged, may be required.

Arm-mounted washer jets are known, but due to high part count, cost of production, difficulty of mounting, or lack of proper fluid distribution, they are not as cost effective in some applications as they otherwise could be.

Although "wet arm" wipers have become more popular recently, they have proven to be either difficult to manufacture and/or expensive, requiring numerous components and complex manufacturing steps and can be difficult to ensure that the spray jets are precisely located on the wiper arm. By way of example, a washer jet described in U.S. Pat. No. 3,827,101 to Wubbe includes a number of components that can be misassembled or loosened in use resulting in leakage of washer fluid and diminished windshield cleaning effectiveness.

BRIEF DESCRIPTION OF THE INVENTION

Consequently, an object of the present invention is to provide a wet arm type windshield wiper assembly that is inexpensive, facilitates manufacturing and assembly, and effectively sprays cleaning fluid on the windshield at the proper time and place during the wiping cycle.

The inventive windshield wiper arm retainer comprises a body that has one or more wall portions. A nozzle mounting bracket is integrally formed from the wall portion to provide, in application, a precise mounting location and orientation for a spray nozzle with minimal additional cost and complexity. This arrangement has the advantage of eliminating extra parts and assembly steps which are costly and can be prone to misassembly and failure in use.

In the preferred embodiment of the invention, the retainer is formed of generally planar malleable material such as sheet metal which is formed into a generally U-shaped cross-section including two generally parallel side wall portions and an interconnecting base wall portion. During manufacturing, as part of the forming process, a fluid dispensing nozzle mounting bracket is integrally formed from one of the above-mentioned wall portions. The mounting bracket can be simply directed away from its associated wall portion or positioned in a spaced parallel relation thereto interconnected by an integral riser portion. This arrangement has the advantage of permitting precise mounting of a spray nozzle on a wiper arm retainer for a given application without adding significant cost to the process.

These and other features and advantages of this invention will become apparent upon reading the following specification which, along with the drawings, describes and discloses preferred and alternative embodiments of the invention in detail.

BRIEF DESCRIPTION OF THE DRAWINGS

FIG. 1, is a broken side view of a windshield wiper arm assembly embodying the present invention;

FIG. 2, is a bottom view of the windshield wiper arm assembly of FIG. 1;

DETAILED DESCRIPTION OF THE PREFERRED AND ALTERNATIVE EMBODIMENTS

Figure 3:
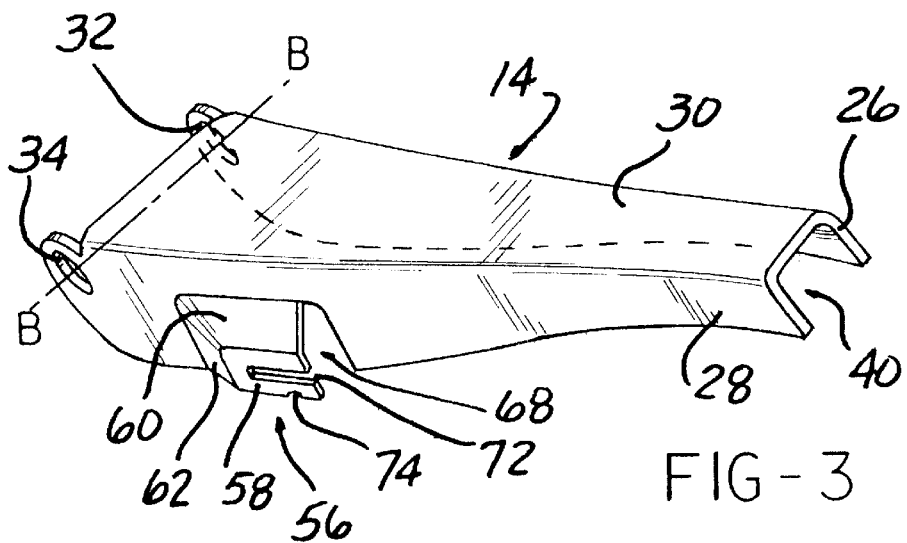
FIG. 3, is a perspective view, on an enlarged scale, of the retainer of the windshield wiper arm assembly of FIG. 1.

Referring to FIGS. 1 and 2, a windshield wiper arm assembly 10 is illustrated. Assembly 10 is composed of a die cast aluminum mounting head 12, a retainer 14 and an arm rod 16. A stepped through bore 18 is formed in one end of mounting head 12 for attachment to an oscillating output drive shaft of a wiper motor (not illustrated). Most commonly, wiper arm assembly 10 is applied on a motor vehicle as a symmetrical pair to wipe the windshield thereof and, in some cases a third wiper arm assembly 10 to wipe the back light thereof. The method of mounting and operation of the overall wiper system is well known in the art and will not be elaborated upon here for the sake of brevity. In application, wiper arm assembly 10 selectively rotates about the axis designated A—A in FIG. 1, concentrically extending through bore 18. A vinyl or rubber washer fluid hose 20 is routed through a passageway 22 formed in mounting head 12 and held in place by a number of clips 24 or other suitable method. In application, the free end of hose 20 is connected to a source of pressurized washing fluid.

Retainer 14 is constructed of sheet metal such as steel formed in a generally inverted U-shaped cross-section as is best illustrated in FIG. 3, including generally parallel, planar side walls 26 and 28 and an interconnecting base wall 30. As can be best seen in FIG. 3, side walls 26 and 28 are not strictly parallel but are tapered slightly and may be slightly contoured for ornamental or packaging purposes not relevant to the present invention. Registering holes 32 and 34 are formed in side walls 26 and 28, respectively, and register concentrically about an axis designated B—B which extends normally to axis A—A. Mounting head 12 and retainer 14 are hinged together by a pin 36 which extends through holes 32 and 34 as well as a mating hole formed in the end of mounting head 12 opposite through-bore 18. Appropriate bushings (not shown) are also included. A spring 38 acts to resiliently urge retainer 14 in a limited clockwise rotation about hinge pin 36 as illustrated in FIG. 1. In application, wiper arm assembly 10 will carry a wiper blade assembly (not illustrated) and spring 38 acts to maintain the wiper blade in contact with the windshield.

Arm rod 16 is an elongated steel wire of generally rectangularly cross-section having one end thereof crimped in its illustrated position by deformation of side walls 26 and 28 of retainer 14 at the end opposite hinge pin 36. Thus, arm rod 16 and retainer 14 are combined in a single rigid assembly which rotates a limited degree about hinge pin 36 while rotating in combination with mounting head 12 about axis A—A.

Hose 20 is dressed around hinge pin 36 and into the cavity 40 defined by the inside surfaces of side walls 26 and 28 and base wall 30. Hose 20 terminates in a Y-connector 42 disposed within cavity 40. One of the outlets of Y-connector 42 is interconnected to the inlet nipple 44 (see FIG. 8) of a washer nozzle 46 mounted adjacent side wall 28 as will be described in detail hereinbelow by an interconnecting hose 48. The second outlet of Y-connector 42 is interconnected to a second washer nozzle 50 by an additional hose 52. Washer nozzle 50 and its attachment method can be any one of a number of available designs such as those described in U.S. Pat. Nos. 5,327,614 and 5,433,382, by way of example. Nozzle 50, illustrated in FIGS. 1 and 2 contemplates an opposed pair of snap hooks which engage the lateral edges of arm rod 16 near its point of interconnection with retainer 14. The furthermost end of arm rod 16 terminates in a traditional shepherds hook 54 such as illustrated in U.S. Pat. No. 5,383,602 which is adapted for pivotal interconnection with a wiper blade assembly as is well known in the art.

Figure 9:
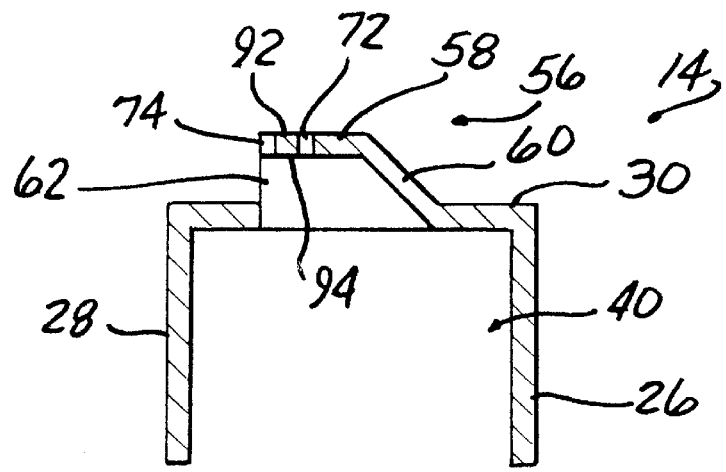
FIG. 9, is a cross-sectional view similar to that shown in FIG. 6 with the mounting bracket alternatively formed in the base wall portion.
Figure 6:
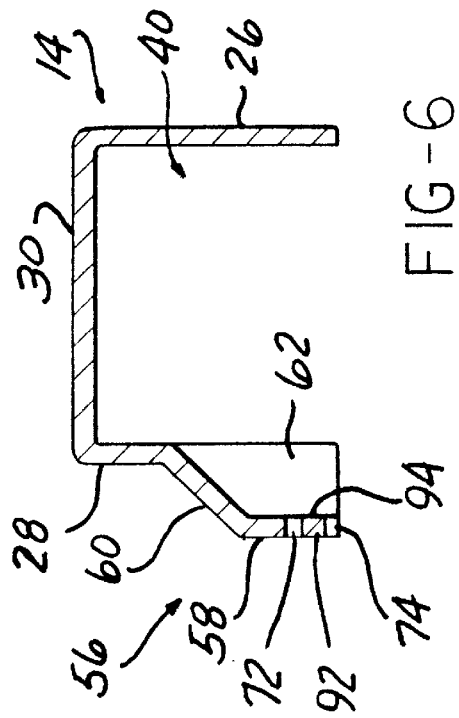
FIG. 6, is a cross-sectional view taken on line VI—VI of FIG. 5.

Referring to FIGS. 3 and 5–7, washer nozzle 46 is mounted to one of the walls 26, 28 or 30 of retainer 14 by means of a mounting bracket 56 which is integrally formed therewith. In the embodiment illustrated, mounting bracket 56 is integrally die formed within side wall 28. However, it could, depending upon the intended application, be formed in side wall 26 as illustrated in FIG. 6 and/or base wall 30 as illustrated in FIG. 9. In the preferred embodiment, mounting bracket 56 includes a generally planar extension portion 58 which is disposed on a plane generally parallel with and laterally spaced from the plane of side wall 28. Extension portion 58 is interconnected with side wall 28 by top and side riser portions 60 and 62, respectively, extending at approximately a 45° angle therebetween. As best viewed in FIG. 5, top riser portion 60 interconnects a top edge 64 of extension portion 58 with side wall 28. Likewise, side riser portion 62 interconnects a left-hand edge 66 of extension portion 58 with side wall 28. This structure provides a very stable, rigid mounting surface for washer nozzle 46 which provides an attractive, compact assembly in which hose 48 can be dressed substantially entirely within cavity 40 and thereby be out of sight from the user.

A clearance gap 68 is provided intermediate the right hand edge 70 of extension portion 58 to facilitate assembly of windshield washer arm assembly 10. A through-slot 72 is formed in extension portion 58 extending leftwardly from the right edge 70 thereof to effectively bifurcate extension portion 58. A detent notch 74 is formed in the bottom edge 76 of extension portion 58.

Figure 8:
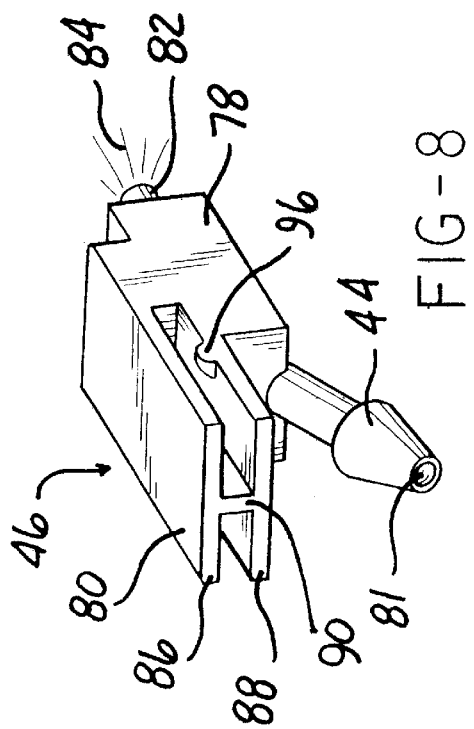
FIG. 8, is a perspective view, on a greatly enlarged scale, of a washer nozzle employed in the preferred embodiment of the present invention.
Figure 5:
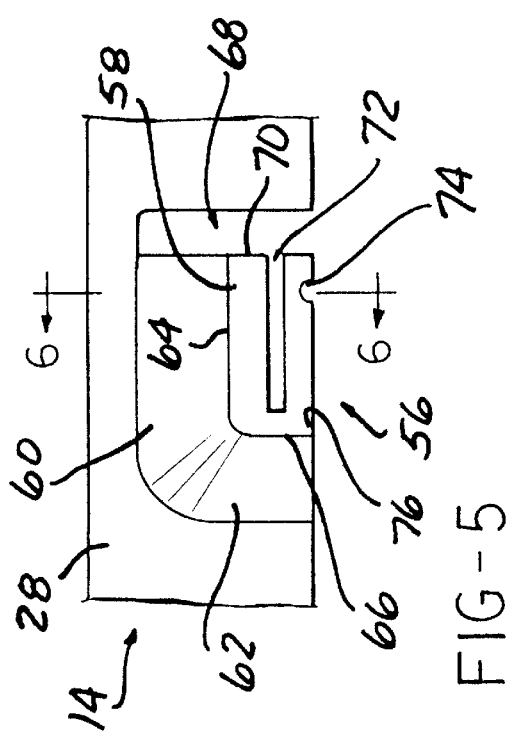
FIG. 5, is a broken view, on an enlarged scale, taken from FIG. 1 showing the details of the preferred fluid nozzle mounting bracket.
Figure 7:
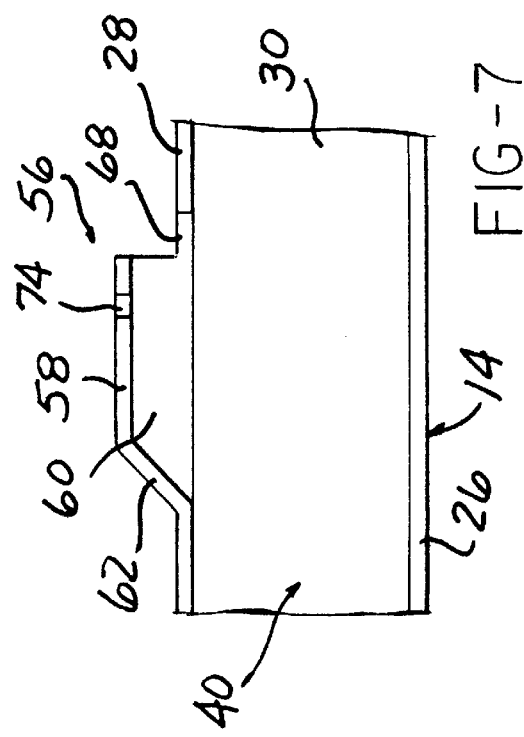
FIG. 7, is a bottom view of the enlarged broken fragment of FIG. 5.

Referring to FIG. 8, the details of spray nozzle 46 are illustrated. Spray nozzle 46 includes a body portion 78 and a generally H-shaped mounting flange 80 integrally formed therewith for mounting washer nozzle 46 with mounting bracket 56. Hose 48 is connected to inlet nipple 44 to provide washer fluid to an inlet port 81. As a result, a spray or mist 84 is expelled from a nozzle port 82. Mounting flange 80 has upper and lower legs 86 and 88, respectively interconnected by a bridge 90.

Washer nozzle 46 is affixed to mounting bracket 56 by aligning bridge 90 of mounting flange 80 with the right hand most opening of through-slot 72 and slip fitting nozzle 46 onto extension portion 58 with upper leg 86 of mounting flange 80 disposed adjacent an outer surface 92 of extension portion 58 and lower leg 88 engaging an inner surface 94 of extension portion 58 until a locating bead 96 integrally formed in lower leg 88 indexes within detent notch 74 to retain washer nozzle 46 in assembly. Bridge 90 serves as a locator within guide slot 72, resulting in precise locating of washer nozzle 46 with the bulk of body portion 78 thereof hidden within cavity 40 and inlet nipple 44 extending downwardly within cavity 40.

Figure 4:
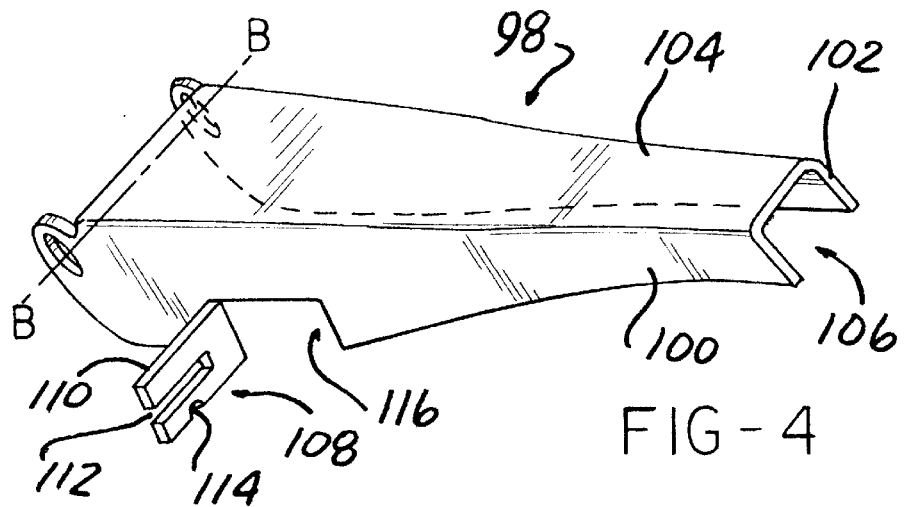
FIG. 4, is a perspective view, on an enlarged scale, of a retainer embodying an alternative embodiment of the fluid dispensing nozzle mounting bracket of the present invention.

Referring to FIG. 4, an alternative embodiment of the present invention is illustrated. A retainer 98 is constructed in a manner similar to that described with respect to drawing FIGS. 1–3 and 5–7 except as denoted hereinbelow. Retainer 98 is die formed from sheet metal into a generally U-shaped configuration having generally parallel side walls 100 and 102 and a base wall 104 collectively defining a cavity 106. A fluid dispensing nozzle mounting bracket 108 is integrally die formed from side wall 100 and includes a generally planar rectangular extension portion 110 which is folded outwardly at a generally right angle to the plane of side wall 100. Extension portion 110 has an inwardly directed through-slot 112 and detent notch 114 formed therein which cooperate with an appropriately configured washer nozzle (not illustrated) to effect mounting thereto. An opening 116 in side wall 100 created by the forming of mounting bracket 108 allows dressing of the washer fluid supply hose (not illustrated) when retainer 98 is employed in application with a windshield wiper arm assembly.

It is to be understood that the invention has been described with reference to specific embodiments and variations to provide the features and advantages previously described and that the embodiments are susceptible of modification as will be apparent to those skilled in the art. For example, the location of the mounting bracket 56, 108 can be relocated upon the side or base walls of the retainer 14, 98 as desired to accommodate a particular positioning requirement of a given application. Accordingly, the foregoing is not to be construed in a limiting sense.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A retainer adapted for use in a windshield wiper arm assembly, said retainer comprising:
    an elongated body constructed of at least one generally planar wall portion composed of malleable material said body having means at one end for attachment to a mounting head and means at the other end for supporting a wiper arm rod
    a fluid dispensing nozzle mounting bracket integrally formed as one piece with said body, said bracket bendably deformed as one integral piece from said wall portion of said body for receiving a fluid dispensing nozzle mountable on said bracket; and
    a fluid dispensing nozzle supported from said mounting bracket.

2. The retainer of claim 1 further comprising:
    a conduit system for interconnecting said nozzle with a washer fluid reservoir.

3. The retainer of claim 1 further comprising:
    an extension portion disposed generally parallel with and spaced from said wall portion; and
    a riser portion interconnecting said extension and wall portions.

4. The retainer of claim 3, wherein said riser portion is positioned on at least two substantially offset disposed planes.

5. The retainer of claim 3, wherein said extension portion comprises means operative to enable resilient self-engagement of a fluid dispensing nozzle mated therewith.

6. The retainer of claim 1, wherein said mounting bracket is formed from one of said side wall portions, said base wall portion, and an extension portion extending generally normally from said wall portion; and
    a generally planar extension portion of said mounting bracket bifurcated to define a nozzle guide slot therein.

7. A windshield wiper arm retainer comprising:
    an elongated body having at least one wall portion with a fluid dispensing nozzle mounting bracket integrally formed as one piece with said body, said body having means at one end for attachment to a mounting head and means at the other end for supporting a wiper arm rod, said bracket extending outwardly integrally as one piece with said wall portion of said body for receiving a fluid dispensing nozzle mountable on said bracket; and
    a fluid dispensing nozzle mounted on said bracket.

8. The windshield wiper arm retainer of claim 7 further comprising:
    a conduit system for interconnecting said nozzle with a washer fluid reservoir.

9. A windshield wiper arm assembly comprising:
    a mounting head adapted for mounting to a rotationally driven shaft;
    a retainer pivotally mounted to said head for relative rotation with respect thereto about an axis generally normal to the axis of said shaft;
    an elongated arm rod having a first end adjacently affixed to said retainer and an opposed end adapted to carry a wiper blade assembly;
    means operative to continuously, resiliently bias said retainer in one direction about said pivot axis to maintain said wiper blade assembly in contact with a wiped surface, said retainer including a body formed from generally planar sheet-like malleable material and a fluid dispensing nozzle mounting bracket integrally formed as one piece with said body, said bracket bendably deformed from said material for receiving a fluid dispensing nozzle mountable on said bracket; and
    a fluid dispensing nozzle mounted on said bracket.

10. The windshield wiper arm assembly of claim 9, wherein said mounting bracket comprises:
    an extension portion disposed generally parallel with and spaced from said wall portion; and
    a riser portion interconnecting said extension and wall portions.

11. The windshield wiper arm assembly of claim 10, wherein said riser portion is positioned on at least two substantially offset disposed planes.

12. The windshield wiper arm assembly of claim 10, wherein said extension portion comprises means operative to enable resilient self-engagement of a fluid dispensing nozzle mated therewith.

13. The windshield wiper arm assembly of claim 9, wherein said retainer is die formed from sheet metal material.

14. The windshield wiper arm assembly of claim 9, wherein said retainer has an elongated, generally U-shaped cross-section configuration including two generally parallel side wall portions and an interconnecting base wall portion.

15. The windshield wiper arm assembly of claim 14, wherein said mounting bracket is formed from one of said side wall portions.

16. The windshield wiper arm assembly of claim 14, wherein said mounting bracket is formed from said base wall portion.

17. The windshield wiper arm assembly of claim 9, wherein said mounting bracket comprises an extension portion extending generally normally from said wall portion.

18. The windshield wiper arm assembly of claim 9, wherein said mounting bracket comprises a generally planar extension portion which is bifurcated to establish a nozzle guide slot therein.

19. A windshield wiper arm assembly comprising:

a mounting head adapted for mounting to a rotationally driven shaft;

a retainer pivotally mounted to said head for relative rotation with respect thereto about an axis generally normal to the axis of said shaft;

an elongate arm rod having a first end adjacently affixed to said retainer and an opposed end adapted to carry a wiper blade assembly;

means operative to continuously, resiliently bias said retainer in one direction about said pivot axis to maintain said wiper blade assembly in contact with a wiped surface, said retainer including a body formed from generally planar sheet-like malleable material and a fluid dispensing nozzle mounting bracket integrally formed as one piece with said body from said material;

a fluid dispensing nozzle mounted on said bracket; and a conduit system for interconnecting said nozzle with a washer fluid reservoir.

* * * * *